United States Patent
Hillen

(10) Patent No.: US 11,951,786 B2
(45) Date of Patent: Apr. 9, 2024

(54) TRAILER HITCH ALIGNMENT SYSTEM AND METHOD

(71) Applicant: Charles Patrick Hillen, Lee's Summit, MO (US)

(72) Inventor: Charles Patrick Hillen, Lee's Summit, MO (US)

(*) Notice: Subject to any disclaimer, the term of this patent is extended or adjusted under 35 U.S.C. 154(b) by 0 days.

(21) Appl. No.: 18/140,409

(22) Filed: Apr. 27, 2023

(65) Prior Publication Data

US 2023/0347695 A1 Nov. 2, 2023

Related U.S. Application Data

(60) Provisional application No. 63/335,512, filed on Apr. 27, 2022.

(51) Int. Cl.
*B60D 1/36* (2006.01)
*B60D 1/52* (2006.01)

(52) U.S. Cl.
CPC .............. *B60D 1/36* (2013.01); *B60D 1/52* (2013.01)

(58) Field of Classification Search
CPC ..................... B60D 1/36; B60D 1/52
See application file for complete search history.

(56) References Cited

U.S. PATENT DOCUMENTS

| | | | | |
|---|---|---|---|---|
| 5,593,172 | A * | 1/1997 | Breslin | B60D 1/155 280/491.5 |
| 6,824,157 | B1 * | 11/2004 | Putnam | B60D 1/06 280/901 |
| 6,915,999 | B2 * | 7/2005 | Wang | B60R 9/06 403/345 |
| 8,640,936 | B2 * | 2/2014 | Ort | B60R 11/00 242/379.2 |
| 10,220,661 | B1 * | 3/2019 | Gebheim | B60D 1/30 |
| 10,486,611 | B1 * | 11/2019 | Klindt | B60R 9/06 |
| 11,066,022 | B1 * | 7/2021 | Shen | B60R 9/06 |
| 2009/0014983 | A1 * | 1/2009 | McKendry | B60D 1/241 280/506 |
| 2022/0379674 | A1 * | 12/2022 | Bernart | B60D 1/46 |

* cited by examiner

*Primary Examiner* — Minnah L Seoh
*Assistant Examiner* — Marlon A Arce
(74) *Attorney, Agent, or Firm* — Law Office of Mark Brown, LLC; Mark E Brown

(57) ABSTRACT

A hitch alignment system includes a hitch alignment tool with a flexible plastic body. The tool body includes a pair of side panels interconnected by a base. A pair of tapered rods extend inwardly from the side panels. A hitch alignment method of the present invention utilizes the tool for aligning the hitch pin holes in a hitch receiver tube with the hole of a connecting shaft. With the receiver tube and connecting shaft holes properly aligned, a hitch pin can be inserted through the aligned holes for securely retaining the connecting shaft of the ball mount.

3 Claims, 7 Drawing Sheets

TRAILER HITCH ALIGNMENT SYSTEM AND METHOD

CROSS-REFERENCE TO RELATED APPLICATION

This application claims priority in U.S. Provisional Patent Application No. 63/335,512, filed Apr. 27, 2022, which is incorporated herein by reference.

BACKGROUND OF THE INVENTION

1. Field of the Invention

The present invention relates generally to systems and methods for hitching trailers and transport racks to vehicles, and particularly to a tool for aligning the hitch pin receivers in a receiver tube with the hitch pin receiver in a connecting shaft for accurately placing a hitch pin safely and conveniently.

2. Description of the Related Art

Trailers are commonly towed behind vehicles for transporting a wide variety of loads. Receiver-type trailer hitch systems generally include tubular receiver assemblies, which are fixedly mounted to vehicle frames, e.g., by mounting bolts or weldments. Receiver-type hitch systems also include ball mounts with hitch shafts, which are telescopically inserted into the hitch receiver tubes and retained therein by hitch locking pins. Clevis-type spring clips can be secured to the hitch pin ends for retaining them in place. The hitch shafts are attached at their distal, rearward ends to brackets which hitch trailer balls. Other applications for receiver-type hitch systems include vehicle-mounted racks for transporting bicycles and various other loads.

A typical trailer hitch also includes a latch for securely retaining the trailer ball within a socket on a trailer coupler. The trailer coupler is typically mounted on the proximal (front) end of a trailer tongue. The latch is typically operated by a latch lever, which is raised and lowered relative to the trailer coupler to release and capture the hitch ball. Padlocks and other security devices are commonly used for locking trailer hitches to trailers for security.

In operation, trailer hitches accommodate relative motion between tow vehicles and trailers, e.g., during turning maneuvers and on inclined surfaces. Many operators remove the hitch assemblies for storage between trailer towing operations. However, when inserting the hitch shafts in the hitch receiver tubes, care must be taken to accurately align the pin receivers. In darkness and inclement weather, such receivers can be difficult to visualize. Moreover, aligning the receivers by tactile feel exposes the individual to risk of cutting his or her finger when pushing and pulling on a hitch shaft to achieve proper alignment.

The alignment system and method of the present invention overcome these difficulties and hazards by providing a system and method for accurately, efficiently and safely positioning a connecting shaft in a vehicle-mounted receiver tube.

Heretofore there has not been available an alignment system and method with the advantages and features of the present invention.

BRIEF SUMMARY OF THE INVENTION

The present invention generally provides a system and method for safely, accurately and conveniently aligning the hitch pen receiver holes with the shaft receiver holes in a hitch.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

Figure 1:
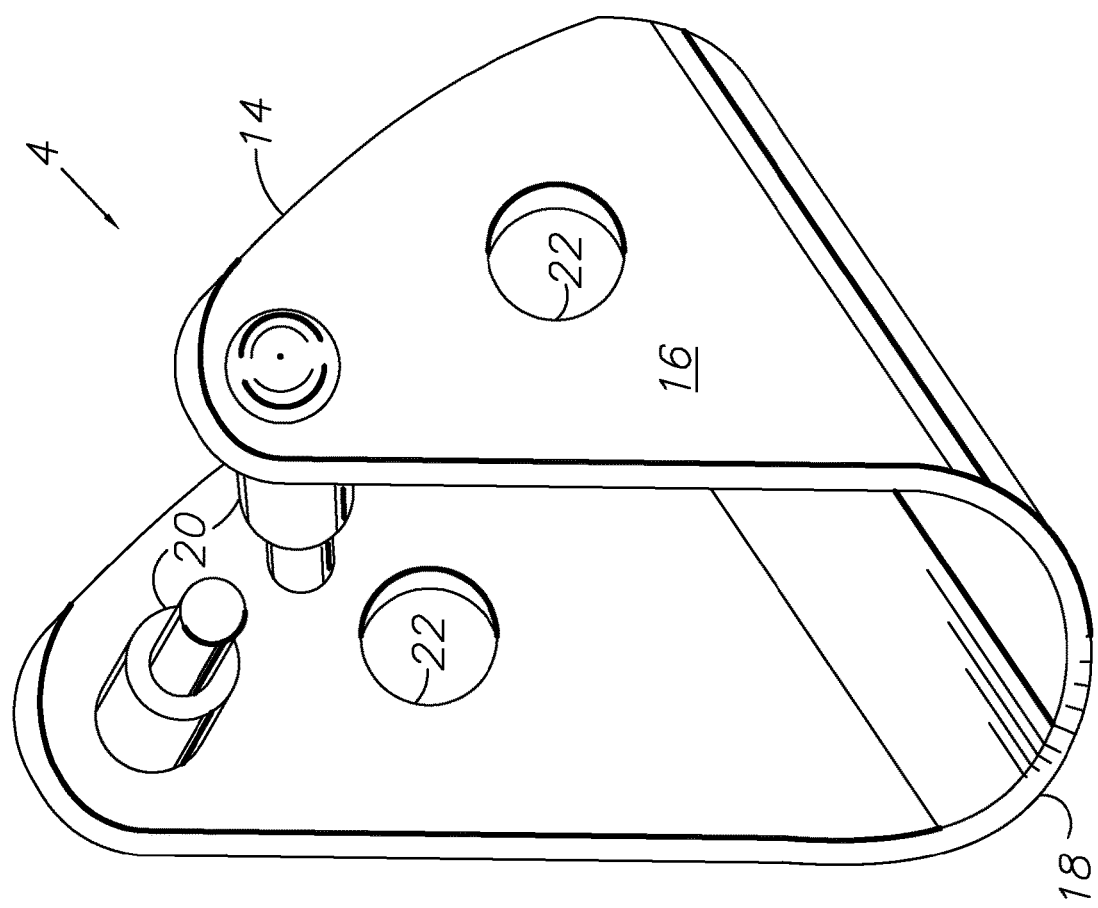
FIG. 1 is a perspective view of a hitch alignment tool comprising an exemplary aspect or embodiment of the present invention.
Figure 2:
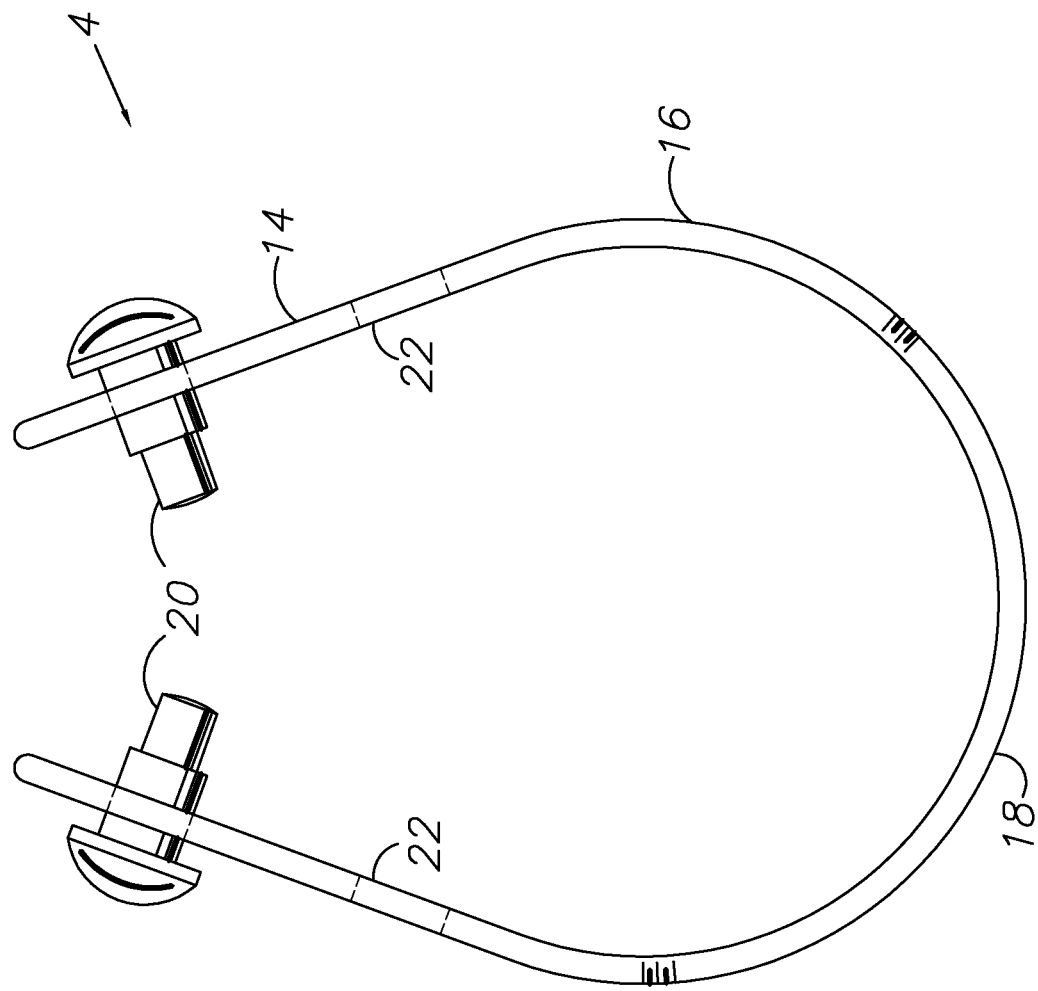
FIG. 2 is an end elevational view thereof.
Figure 3:
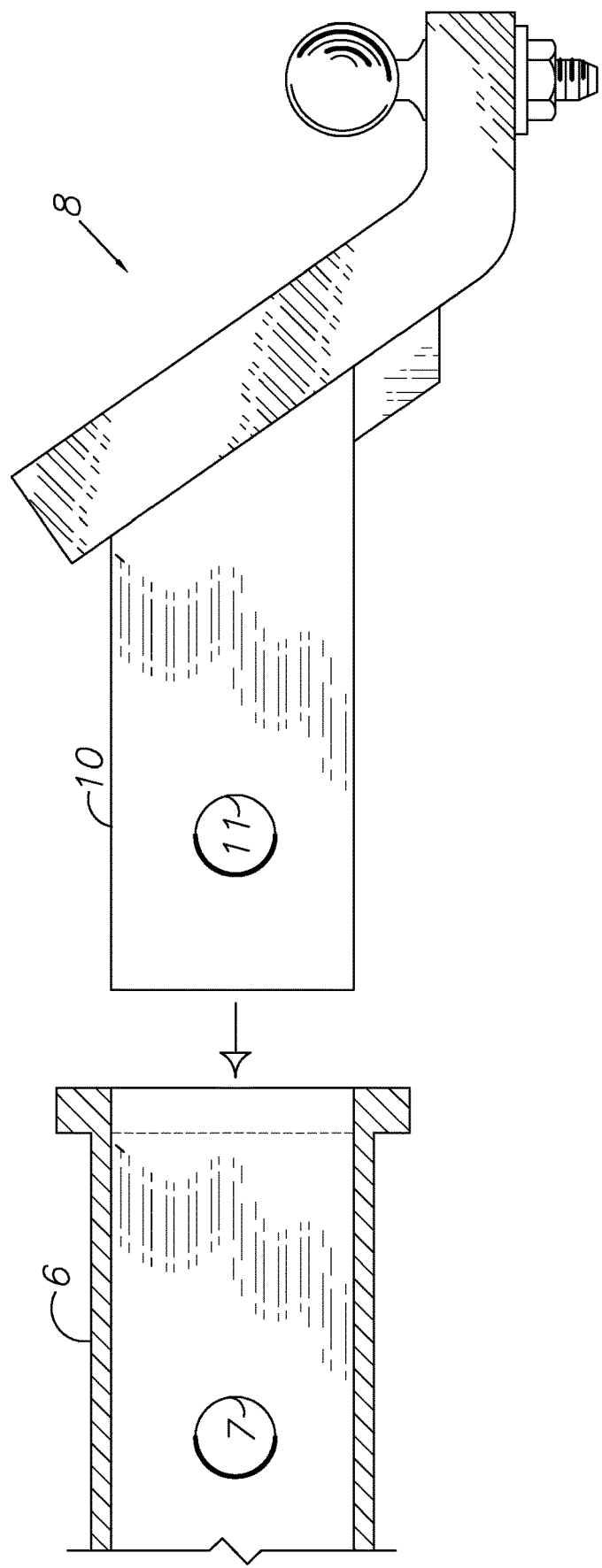
FIG. 3 is a side elevational view of a typical hitch with a vehicle-mounted hitch receiver tube.
Figure 4:
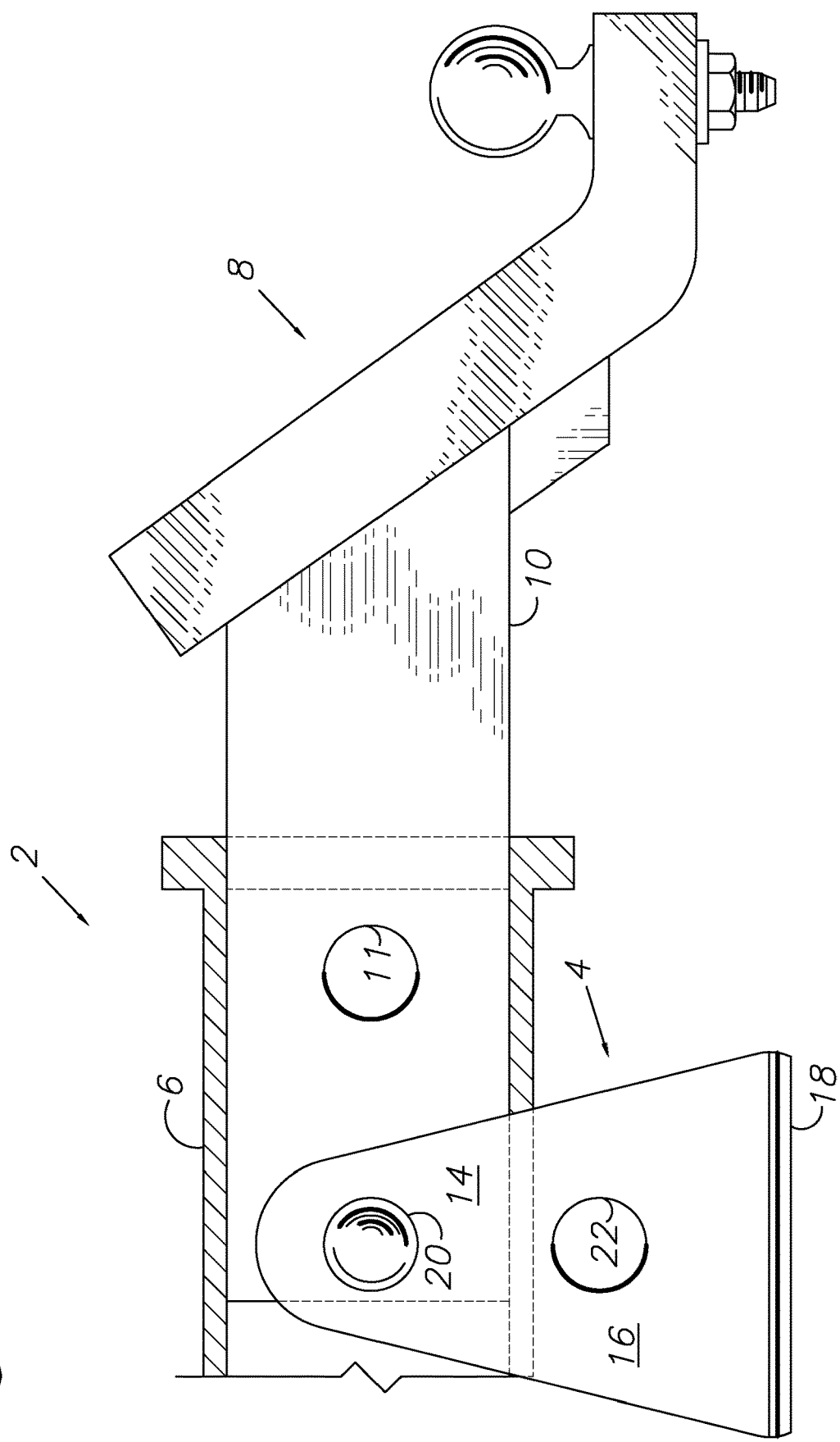
FIG. 4 is a side elevational view showing a ball mount connecting shaft partially inserted in the hitch receiver tube.
Figure 5:
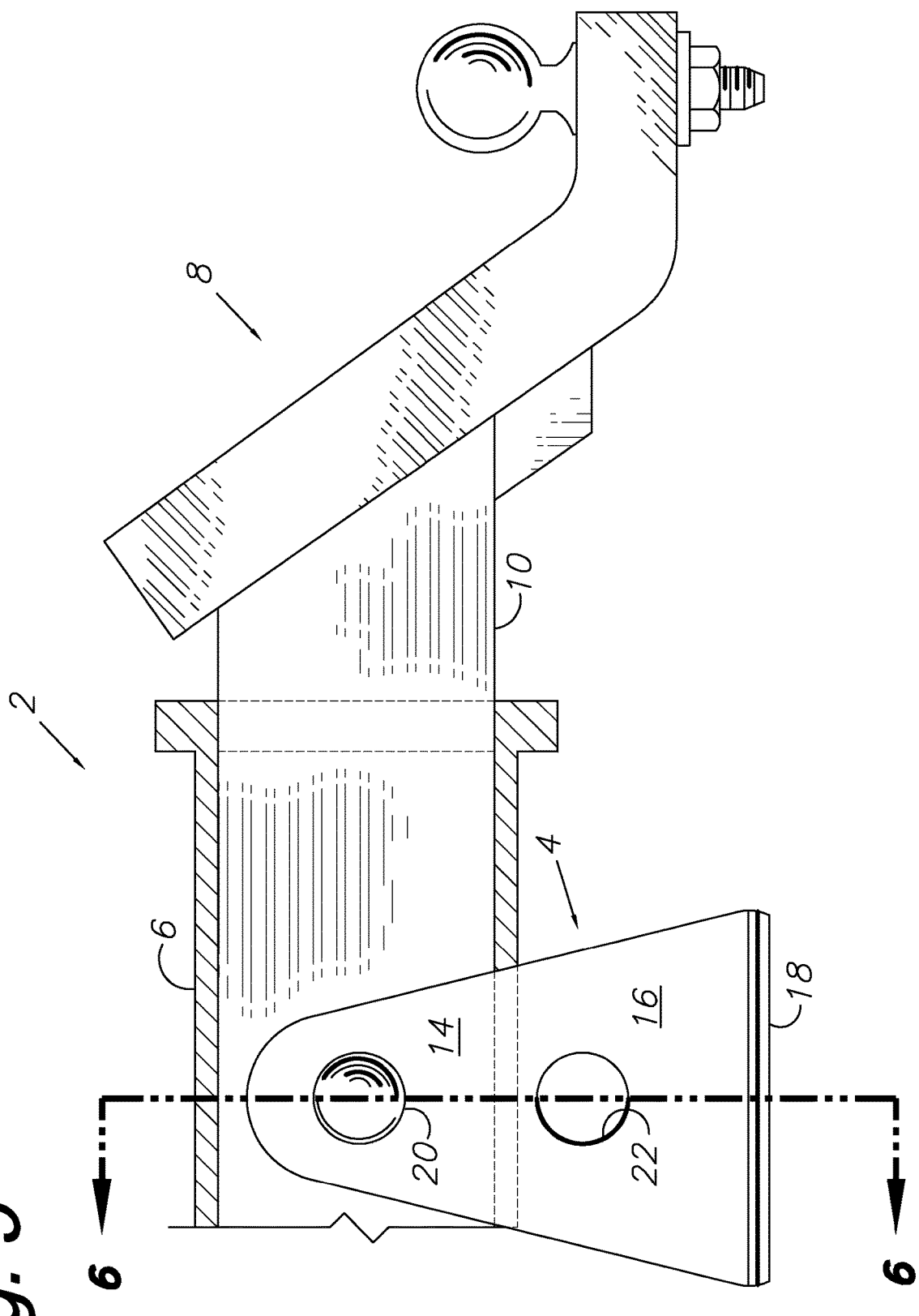
FIG. 5 is a side elevational view showing the ball mount connecting shaft fully inserted in the hitch receiver tube.
Figure 6:
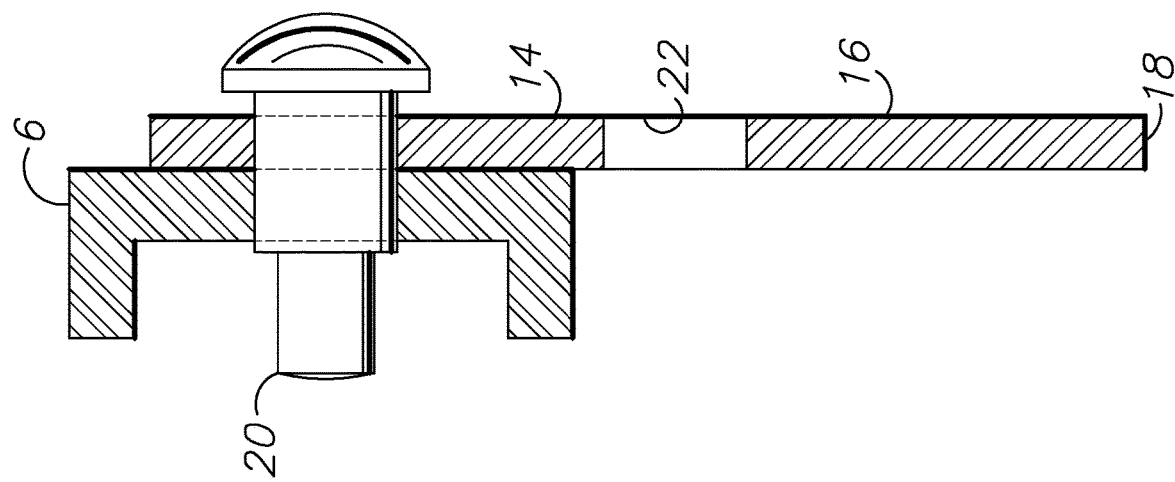
FIG. 6 is a fragmentary, cross-sectional view taken generally along line 6-6 in FIG. 5.
Figure 7:
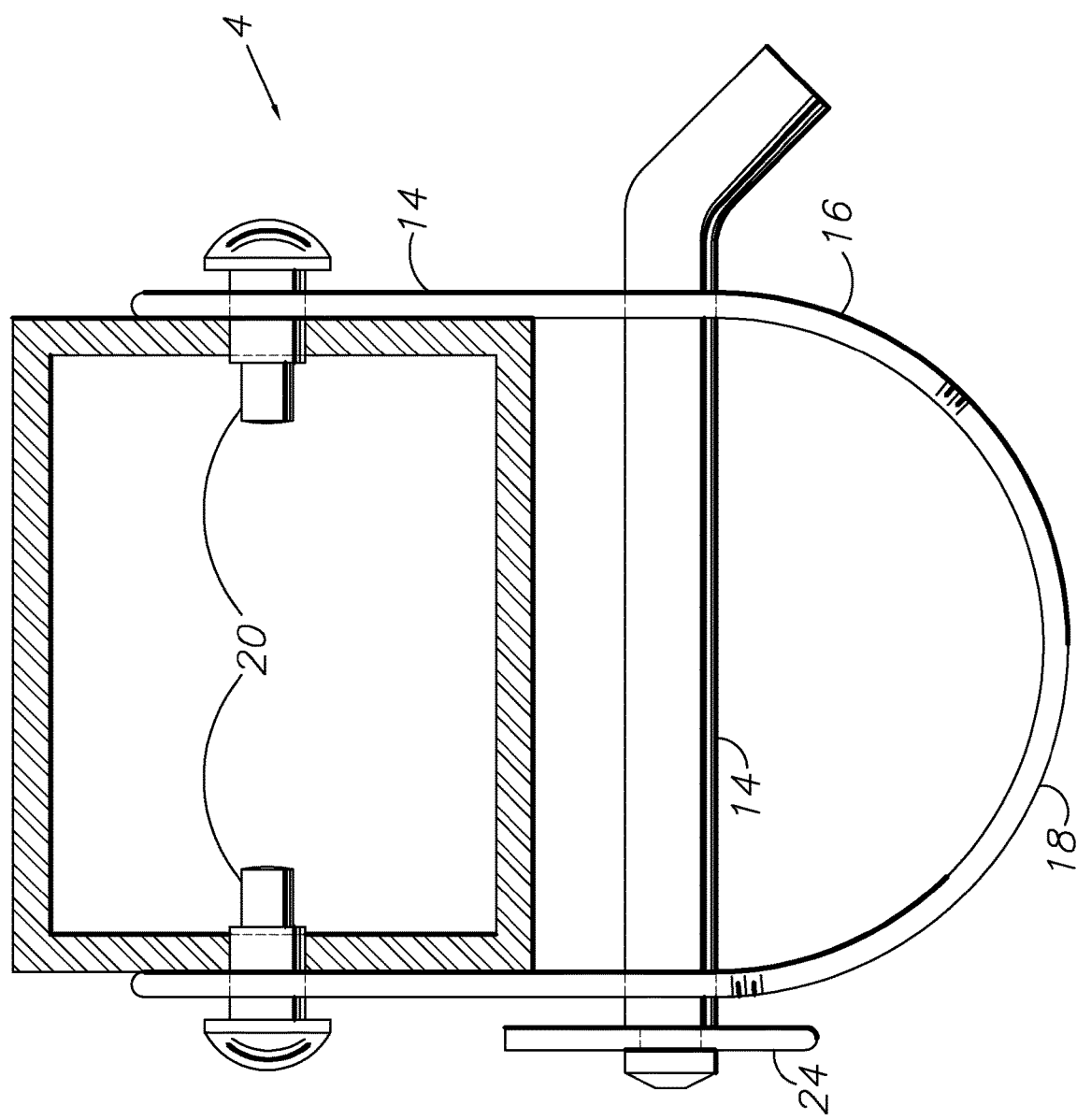
FIG. 7 is an end elevational view showing the hitch alignment tool in a storage position with a hitch pin mounted on the hitch alignment tool.

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Hitch Alignment System 2

Referring to the drawings in more detail, the reference numeral 2 generally designates a hitch alignment system embodying an aspect of the present invention and including a hitch alignment tool 4. Without limitation on the useful applications of the present invention, the hitch alignment system can be used for properly aligning the hitch pin holes in a hitch receiver tube 6 with the corresponding hitch pin hole 11 in the connecting shaft 10 of a ball mount 8 or a transport rack. With the hitch pin holes 7, 11 aligned by the hitch alignment tool 4, the hitch pin 12 can be placed to effectively couple a tow vehicle and a trailer, or a load rack. The hitch pin 12 is retained in place by a clevis pin 24.

The hitch alignment tool 4 generally includes a body 14 with a generally U-shaped configuration including a pair of side panels 16 joined by a tool base 18. The tool body 14 is preferably formed from a suitable flexible plastic material, e.g., acrylonitrile butadiene styrene (ABS), enabling the tool body 14 to flex for placement on the hitch receiver tube 6. Each side panel 16 mounts a respective alignment rod 20 with an inwardly-tapering configuration. Each side panel also includes a hitch pin opening 22.

III. Trailer Hitch Alignment Method

In operation, the hitch alignment tool 4 can be placed on the vehicle-mounted hitch receiver tube 6 to accurately align the hitch receiver holes 7 with the connecting shaft hole 11. The aligned holes 7, 11 receive the hitch pin 12 to complete a vehicle-trailer hitch or a transport rack coupling.

With the connecting shaft 10 inserted in the hitch receiver tube 6, the flexible, plastic body 14 of the alignment tool 4 is flexed and placed over the receiver tube 6 with the alignment rods 20 in the receiver tube holes 7. The shaft can then be slid longitudinally in or out until the alignment rods 20 snap into the hitch pin hole 11 in the shaft 10. The alignment tool is then removed, and the hitch pin can easily be slid into the properly aligned holes 7, 11 for securing the hitch coupling 10 to a vehicle. A trailer hitch coupling can be completed by clamping the trailer coupler on the trailer ball, attaching safety chains and connecting a trailer wiring harness for safety lights on a trailer.

When not in use, the alignment tool 4 can be placed over the receiver tube with the hitch pin 12 in the hitch pin holes 22 for convenient storage until needed.

It is to be understood that while certain embodiments and/or aspects of the invention have been shown and described, the invention is not limited thereto and encompasses various other embodiments and aspects. For example, the hitch alignment tool 4 is scalable to accommodate various classes of hitches.

Having thus described the invention, what is claimed as new and desired to be secured by Letters Patent is:

1. A hitch alignment tool configured for aligning holes in a hitch receiver tube with a hole in a hitch mount connecting shaft whereby a hitch pin can be removably inserted through said aligned holes, said hitch alignment tool comprising:

a tool body comprising a flexible material and forming a generally U-shaped or horseshoe-shaped cross-sectional configuration with opposite side panels and a base mounting said side panels in generally parallel, spaced relation;

a hitch pin hole in each respective tool body side panel configured for placing the hitch pin through said hitch pin holes and receiver tube holes to store the tool when not in use;

a pair of alignment rods each having a proximal portion mounted on a respective body side panel and a distal portion extending inwardly from said proximal portion;

each said alignment rod proximal portion having a first diameter and each said alignment rod distal portion having a second diameter less than said first diameter;

said alignment rods configured for receipt in said receiver tube and connecting shaft holes;

said alignment rods configured for aligning said receiver tube and connecting shaft holes;

said hitch alignment tool having:

a. a storage configuration, wherein said hitch alignment tool is placed over the receiver tube with hitch pin inserted through said hitch pin holes and the receiver tube holes;

b. a pre-alignment configuration, wherein the connecting shaft is inserted into the receiver tube so that the surface of the connecting shaft covers the receiver tube holes, and the hitch alignment tool is placed around the receiver tube with the alignment rods inserted into the receiver tube holes and touching the surface of the connecting shaft;

c. an alignment configuration, achieved by placing the hitch alignment tool in the pre-alignment configuration, then telescopically sliding the connecting shaft longitudinally in or out until the alignment rods snap into the connecting shaft hole; and d. a coupled configuration, wherein the hitch mount connecting shaft is coupled to the receiver tube by outwardly flexing the hitch alignment tool when in the alignment configuration to extract the alignment rods and remove the tool with the receiver tube and connecting shaft holes aligned, the hitch pin is inserted through said aligned hitch receiver and connecting shaft holes, and the hitch alignment tool is placed over the coupled receiver tube and connecting shaft.

2. The hitch alignment tool of claim 1, further comprising:

said hitch pin including a distal end with a removable retainer configured for removably retaining said hitch pin in said aligned receiver tube and hitch connecting shaft holes.

3. The hitch alignment tool of claim 1, further comprising:

said alignment rods having a tapered configurations tapering inwardly from said tool body side panels.

\* \* \* \* \*